United States Patent
Rozman et al.

(10) Patent No.: US 10,727,769 B2
(45) Date of Patent: Jul. 28, 2020

(54) VOLTAGE REGULATION OF PERMANENT MAGNET GENERATOR WITH EXTENDED SPEED RANGE

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockton, IL (US); Mohammad Shahamat, Rockton, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/713,273

(22) Filed: Sep. 22, 2017

(65) Prior Publication Data

US 2019/0097558 A1 Mar. 28, 2019

(51) Int. Cl.
*H02P 9/30* (2006.01)
*H02P 25/18* (2006.01)
*H02P 9/48* (2006.01)
*H02P 9/14* (2006.01)

(52) U.S. Cl.
CPC .......... *H02P 9/305* (2013.01); *H02P 9/14* (2013.01); *H02P 9/48* (2013.01); *H02P 25/18* (2013.01)

(58) Field of Classification Search
CPC ........................................ H02P 9/305
USPC .......................................... 322/44
See application file for complete search history.

(56) References Cited

U.S. PATENT DOCUMENTS

| | | | |
|---|---|---|---|
| 4,739,466 A * | 4/1988 | Glennon | H02M 7/219 363/127 |
| 5,936,855 A * | 8/1999 | Salmon | H02M 1/4216 363/46 |
| 6,108,223 A * | 8/2000 | Julian | H02M 7/21 363/78 |
| 6,239,582 B1 * | 5/2001 | Buzan | H02J 7/1492 320/137 |
| 6,700,242 B2 | 3/2004 | Kawamura | |
| 7,406,370 B2 | 7/2008 | Kojori et al. | |

(Continued)

FOREIGN PATENT DOCUMENTS

| | | |
|---|---|---|
| CN | 201061153 | 5/2008 |
| JP | 2008278567 | 11/2008 |
| JP | 2014027715 | 2/2014 |

OTHER PUBLICATIONS

Rozman et al., U.S. Appl. No. 15/714,746, filed Sep. 25, 2017, entitled "Electric System Architecture for a Vehicle With Multiple Load Characteristics".

(Continued)

*Primary Examiner* — Sean Gugger
(74) *Attorney, Agent, or Firm* — Snell & Wilmer, L.L.P.

(57) ABSTRACT

An electric power system (EPS) may comprise a permanent magnet synchronous generator (PMSG), a high speed rectifier configured to receive a first alternating current (AC) power from the PMSG, and a low speed rectifier configured to receive a second AC power from the PMSG. The low speed rectifier may be configured to receive the first AC power in response to the PMSG rotating at a first rotational speed, and the high speed rectifier may be configured to receive the second AC power in response to the PMSG rotating at a second faster rotational speed.

16 Claims, 4 Drawing Sheets

(56) References Cited

U.S. PATENT DOCUMENTS

| | | | |
|---|---|---|---|
| 7,439,634 B2 | 10/2008 | Michalko | |
| 7,830,686 B2 | 11/2010 | Zeng et al. | |
| 8,427,116 B2 | 4/2013 | Rozman et al. | |
| 8,432,137 B2 | 4/2013 | Rozman et al. | |
| 9,077,237 B2 | 7/2015 | Ganev et al. | |
| 9,328,661 B2 | 5/2016 | Ho et al. | |
| 2002/0047448 A1* | 4/2002 | Kawamura | B60K 6/26 310/181 |
| 2002/0084705 A1* | 7/2002 | Kawamura | H02K 11/0094 310/68 R |
| 2002/0097027 A1* | 7/2002 | Asao | H02P 9/307 322/28 |
| 2003/0075997 A1* | 4/2003 | Keim | B60L 11/1803 310/68 D |
| 2006/0152085 A1 | 7/2006 | Flett | |
| 2006/0273766 A1* | 12/2006 | Kawamura | H02K 3/28 322/46 |
| 2008/0315584 A1* | 12/2008 | Rozman | H02P 1/46 290/34 |
| 2009/0261586 A1* | 10/2009 | Maddali | H02P 9/305 290/6 |
| 2010/0320863 A1* | 12/2010 | Nishimura | H02K 3/28 310/198 |
| 2011/0155703 A1 | 6/2011 | Winn | |
| 2012/0126758 A1* | 5/2012 | Fang | H02P 9/48 322/29 |
| 2014/0266079 A1* | 9/2014 | Rozman | H02P 9/02 322/28 |
| 2015/0194877 A1 | 7/2015 | Hsiao et al. | |
| 2016/0153751 A1 | 6/2016 | Hagen et al. | |
| 2016/0322924 A1 | 11/2016 | Oriol et al. | |
| 2017/0070150 A1 | 3/2017 | Kim | |
| 2017/0359009 A1* | 12/2017 | Rozman | H02K 11/049 |

OTHER PUBLICATIONS

European Patent Office, European Search Report dated Jan. 2, 2019 in Application No. 18195657.4.
European Patent Office, European Search Report dated Jan. 24, 2019 in Application No. 18196029.5.
Yigeng Huangfu et al: "High Power Efficiency Buck Converter Design for Standalone Wind Generation System", International Journal of Antennas and Propagation, vol. 2015, Jan. 1, 2015 (Jan. 1, 2015), pp. 1-9.
USPTO, Non-Final Office Action dated Jul. 29, 2019 in U.S. Appl. No. 15/714,746.
USPTO, Notice of Allowance dated Nov. 18, 2019 in U.S. Appl. No. 15/714,746.
USPTO, Notice of Allowance dated Jan. 23, 2020 in U.S. Appl. No. 15/714,746.

* cited by examiner

VOLTAGE REGULATION OF PERMANENT MAGNET GENERATOR WITH EXTENDED SPEED RANGE

FIELD

The disclosure generally relates to electrical power systems, and more particularly to the design of an electrical power generating system for a vehicle.

BACKGROUND

Vehicles, including ground vehicles and underwater vehicles, have migrated toward hybrid electric technology using high voltage direct current distribution. A permanent magnet synchronous generator (PMSG) may be used to generate electric power for an electronic power system (EPS). A PMSG typically includes three stator windings and a rotor with permanent magnets (PMs) to generate a single three-phase voltage. The three-phase voltage may be outputted to a rectifier for conversion to a DC voltage. The output voltage of the PMSG may correspond to the rotational speed of the rotor.

SUMMARY

In various embodiments, an electric power system (EPS) is disclosed, comprising a permanent magnet synchronous generator (PMSG) comprising a first stator winding, a second stator winding, and a third stator winding, a high speed rectifier bridge configured to receive a first alternating current (AC) power from the PMSG, and a low speed rectifier bridge configured to receive a second AC power from the PMSG, wherein the low speed rectifier bridge is configured to receive the first AC power in response to the PMSG rotating at a first rotational speed, and the high speed rectifier bridge is configured to receive the second AC power in response to the PMSG rotating at a second rotational speed.

In various embodiments, the first AC power corresponds to a first number of turns of the first stator winding and the second AC power corresponds to a second number of turns of the first stator winding.

In various embodiments, the first number of turns is less than the second number of turns.

In various embodiments, the high speed rectifier bridge is configured to rectify the first AC power into a first direct current (DC) power, and the low speed rectifier bridge is configured to rectify the second AC power into a second DC power.

In various embodiments, the EPS further comprises a first circuit breaker configured to at least one of activate and disable the low speed rectifier bridge, and a second circuit breaker configured to at least one of activate and disable the high speed rectifier bridge.

In various embodiments, the first circuit breaker activates the low speed rectifier bridge in response to the PMSG rotating at the first rotational speed, the second circuit breaker activates the high speed rectifier bridge in response to the PMSG rotating at the second rotational speed, the first circuit breaker disables the low speed rectifier bridge in response to the PMSG rotating at the second rotational speed, and the second circuit breaker disables the high speed rectifier bridge in response to PMSG rotating at the first rotational speed.

In various embodiments, the EPS further comprises a filter configured to filter at least one of the first DC power and the second DC power.

In various embodiments, the EPS further comprises a control coil converter configured to control an output voltage of the PMSG.

In various embodiments, the high speed rectifier bridge is connected to each of the first stator winding, the second stator winding, and the third stator winding of the PMSG at a location between the first number of turns and the second number of turns.

In various embodiments, a PMSG is disclosed, comprising a plurality of stator windings, wherein each of the plurality of stator windings has a first section having a first number of turns and a second section having a second number of turns, wherein each of the stator windings has a first output attachment point between the first section and the second section, and wherein each of the stator windings has a second output attachment point opposite the second section from the first section.

In various embodiments, the plurality of stator windings comprises a first stator winding, a second stator winding, and a third stator winding.

In various embodiments, each of the first sections is connected in series with the corresponding second section.

In various embodiments, the PMSG further comprises a control coil for controlling an output voltage of the PMSG.

In various embodiments, the second output attachment point corresponds to a sum of the first number of turns and the second number of turns.

In various embodiments, the first output attachment point corresponds to the first number of turns.

In various embodiments, the first output attachment point is configured to be activated in response to the PMSG rotating at a second rotational speed and the second output attachment point is configured to be activated in response to the PMSG rotating at a first rotational speed, the first rotational speed is less than the second rotational speed.

In various embodiments, a method for operating an EPS is disclosed, comprising activating a low speed rectifier bridge in response to a permanent magnet synchronous generator (PMSG) rotating at a first speed, and activating a high speed rectifier bridge in response to the PMSG rotating at a second speed, wherein the low speed rectifier bridge receives a first AC power corresponding to a second number of turns of the PMSG, and wherein the high speed rectifier bridge receives a second AC power corresponding to a first number of turns of the PMSG.

In various embodiments, the method further comprises rotating the PMSG.

In various embodiments, the method further comprises generating the first AC power in response to the rotating, generating the second AC power in response to the rotation, generating a first DC power utilizing the first AC power, wherein the first DC power is generated by the low speed rectifier bridge, and generating a second DC power utilizing the second AC power, wherein the second DC power comprises a second power.

In various embodiments, the method further comprises powering an electronic device with at least one of the first DC power or the second DC power in response to the rotation.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The number of turns of a stator winding of a permanent magnet synchronous generator (PMSG) may correspond to the voltage output of a PMSG. Stated differently, at a given rotational speed, the voltage output of a PMSG may increase with the number of turns in the stator winding. In this regard, the voltage output of a PMSG spinning at varying rotational speeds may be controlled by varying the number of turns in the stator windings. An EPS, in accordance with the present disclosure, may include a high speed rectifier bridge in electronic communication with a first number of turns of a stator winding and a low speed rectifier bridge in electronic communication with a second number of turns of the stator winding. The EPS may be configured to switch between the low speed rectifier bridge and the high speed rectifier bridge in response to a rotational speed of the PMSG. EPSs of the present disclosure may result in improved voltage regulation over extended speed ranges of a PMSG.

Figure 1:
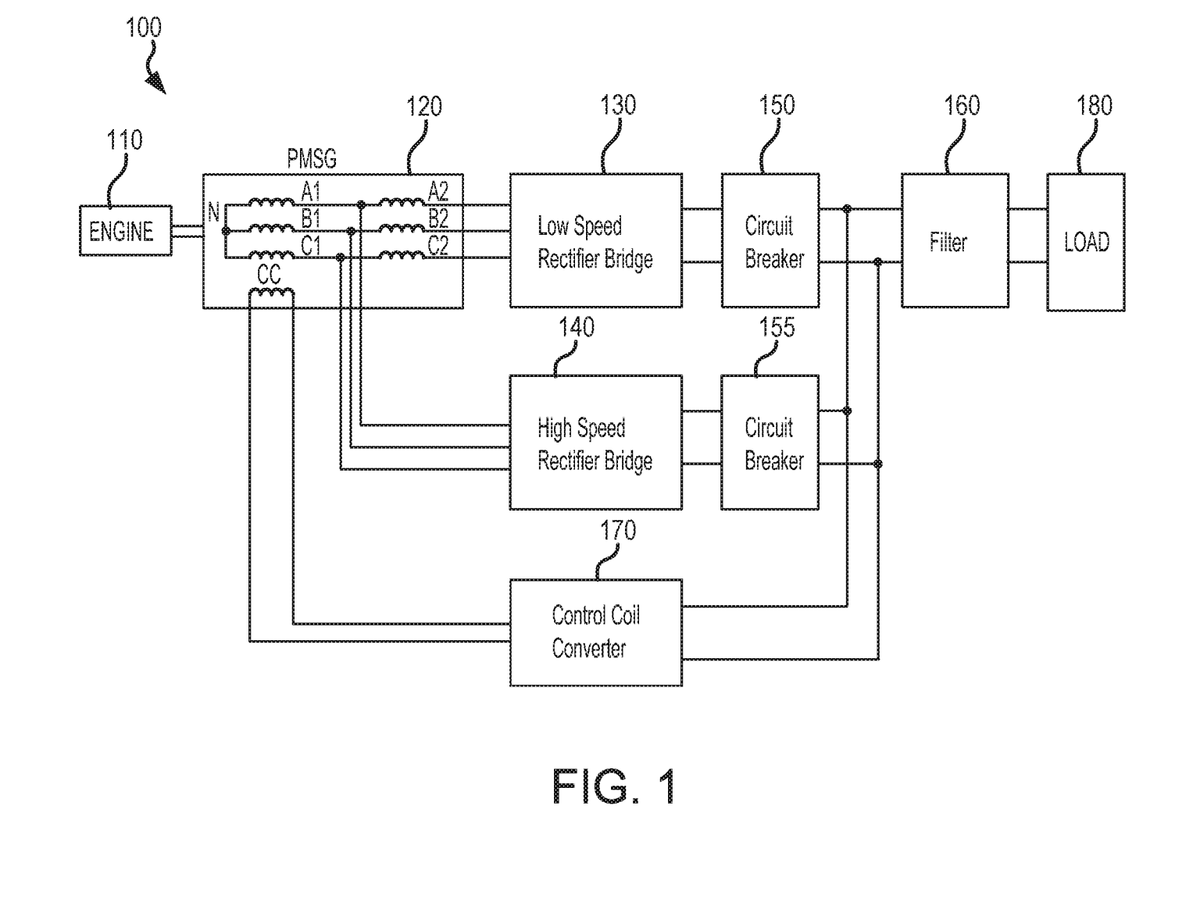
FIG. 1 illustrates a schematic view of an EPS having a low speed rectifier bridge and a high speed rectifier bridge, in accordance with various embodiments.

With reference to FIG. 1, a schematic view of an electric power system (EPS) 100 is illustrated, in accordance with various embodiments. EPS 100 may include an engine 110, a flux regulated PMSG 120, a rectifier (also referred to herein as a low speed rectifier bridge) 130, a rectifier (also referred to herein as a high speed rectifier bridge) 140, a circuit breaker (also referred to herein as a first circuit breaker) 150, a circuit breaker (also referred to herein as a second circuit breaker) 155, a filter 160, a control coil converter 170, and a load 180.

In various embodiments, PMSG 120, rectifier 130, circuit breaker 150, and filter 160 may be connected in series. PMSG 120, rectifier 140, circuit breaker 155, and filter 160 may be connected in series. Rectifier 130 and circuit breaker 150 may be connected in parallel with rectifier 140 and circuit breaker 155.

In various embodiments, engine 110 may comprise a gas engine, a diesel engine, a gas turbine engine, or any other suitable engine for rotating a rotor of PMSG 120. PMSG 120 may include a rotor and a stator. The rotor may be driven by engine 110. PMSG 120 may generate electric power in response to rotation of the rotor. This electric power may be rectified from an alternating current (AC) power into a direct current (DC) power by rectifier 130 and/or rectifier 140. This electric power may pass through output filter 160 to load 160. Circuit breaker 150 may be configured to be switched between a closed and open position, or on and off position, respectively. Stated differently, filter 160 may receive electric power from PMSG 120, via rectifier 130, in response to circuit breaker 150 being in a closed position. Filter 160 may be electronically disconnected from rectifier 130 in response to circuit breaker 150 being in an open position. Similarly, circuit breaker 155 may be configured to be switched between a closed and open position. Filter 160 may receive electric power from PMSG 120, via rectifier 140, in response to circuit breaker 155 being in a closed position. Filter 160 may be electronically disconnected from rectifier 140 in response to circuit breaker 155 being in an open position.

In various embodiments, circuit breaker 150 may be configured to move from an open position to a closed position in response to circuit breaker 155 moving from a closed position to an open position. Stated differently, circuit breaker 150 may be configured to disable rectifier 130 in response to rectifier 140 being activated. Rectifier 140 may be activated in response to circuit breaker 155 being in a closed position, also referred to as being switched on. Similarly, circuit breaker 155 may be configured to disable rectifier 140 in response to rectifier 130 being activated. Rectifier 130 may be activated in response to circuit breaker 150 being in a closed position. In various embodiments, circuit breaker 150 and circuit breaker 155 may be switched off simultaneously. As used herein, the term "activate" may refer to circuit breaker 150 providing DC power from rectifier 130, or may refer to circuit breaker 150 providing AC power to rectifier 130 (if circuit breaker 150 is coupled between PMSG 120 and rectifier 130). As used herein, the term "disable" may refer to circuit breaker 150 preventing (e.g., via disconnecting of a power line) DC power from being supplied by rectifier 130, or may refer to circuit breaker 150 preventing AC power from being supplied to rectifier 130 (if circuit breaker 150 is coupled between PMSG 120 and rectifier 130). The terms "activate" and "disable" may be used similarly herein with respect to circuit breaker 155.

Control coil converter 170 may control the control coil (CC). Control coil (CC) may control the direct current (DC) output voltage of PMSG 120. In this regard, control coil converter 170 may detect the DC output voltage of PMSG 120 and regulate said voltage via control coil (CC).

Figure 2:
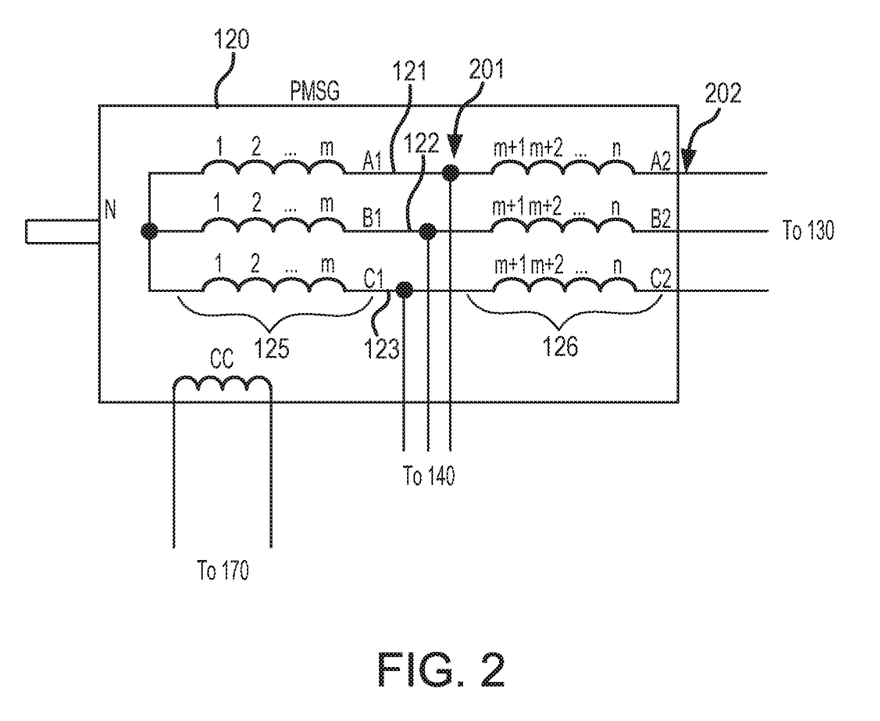
FIG. 2 illustrates a schematic view of a permanent magnet synchronous generator (PMSG) having a plurality of stator windings, each stator winding having a first section with a first number of turns and a second section with a second number of turns, in accordance with various embodiments.

With reference to FIG. 2, PMSG 120 may comprise three stator windings. In this regard, PMSG 120 may comprise a first stator winding 121, a second stator winding 122, and a third stator winding 123. Each stator winding 121, 122, 123 may comprise a first section 125 having a first number of turns (m) and a second section 126 having a second number of turns (n–m). For example, if m is equal to 100 and n is equal to 225, then the first section would have 100 turns and the second section would have 125 turns. First section 125 of first stator winding 121 may be connected in series with second section 126 of first stator winding 121. Similarly, first section 125 of second stator winding 122 may be connected in series with second section 126 of second stator winding 122 and first section 125 of third stator winding 123 may be connected in series with second section 126 of third stator winding 123.

With combined reference to FIG. 1 and FIG. 2, first stator winding 121, second stator winding 122, and third stator winding 123 may each comprise a first output attachment point 201 between each first section 125 and each second section 126, whereby rectifier 140 is coupled to PMSG 120. Furthermore, first stator winding 121, second stator winding 122, and third stator winding 123 may each comprise a second output attachment point 202 located opposite each second section 126 from each first section 125, whereby rectifier 130 is coupled to PMSG 120. In this regard, each first output attachment point 201 may correspond to the first number of turns (m) and each second output attachment point 202 may correspond to the sum of the first number of turn and the second number of turns (n).

In various embodiments, rectifier 130 may receive an alternating current (AC) power (also referred to herein as a second AC power) from PMSG 120 corresponding to both first section 125 and second section 126. Stated differently, all turns (n) (also referred to herein as a second number of turns) of the PMSG stator may be utilized to generate the AC power received by rectifier 130. Rectifier 140 may receive an AC power (also referred to herein as a first AC power) from PMSG 120 corresponding to solely first section 125. Stated differently, solely m number of turns (also referred to herein as a first number of turns) of the PMSG stator may be utilized to generate the AC power received by rectifier 140. In this regard, rectifier 130 may be utilized in response to PMSG having a first rotational speed, for example between $\omega_1$ and $\omega_2$ and rectifier 140 may be utilized in response to PMSG having a second rotational speed, for example between $\omega_2$ and $\omega_3$, wherein $\omega_1 < \omega_2 < \omega_3$. In various embodiments, circuit breaker 150 may activate rectifier 130 in response to PMSG having the first rotational speed. In various embodiments, circuit breaker 155 may activate rectifier 140 in response to PMSG having the second rotational speed. In various embodiments, circuit breaker 150 may disable rectifier 130 in response to PMSG having the second rotational speed. In various embodiments, circuit breaker 155 may disable rectifier 140 in response to PMSG having the first rotational speed.

Figure 3:
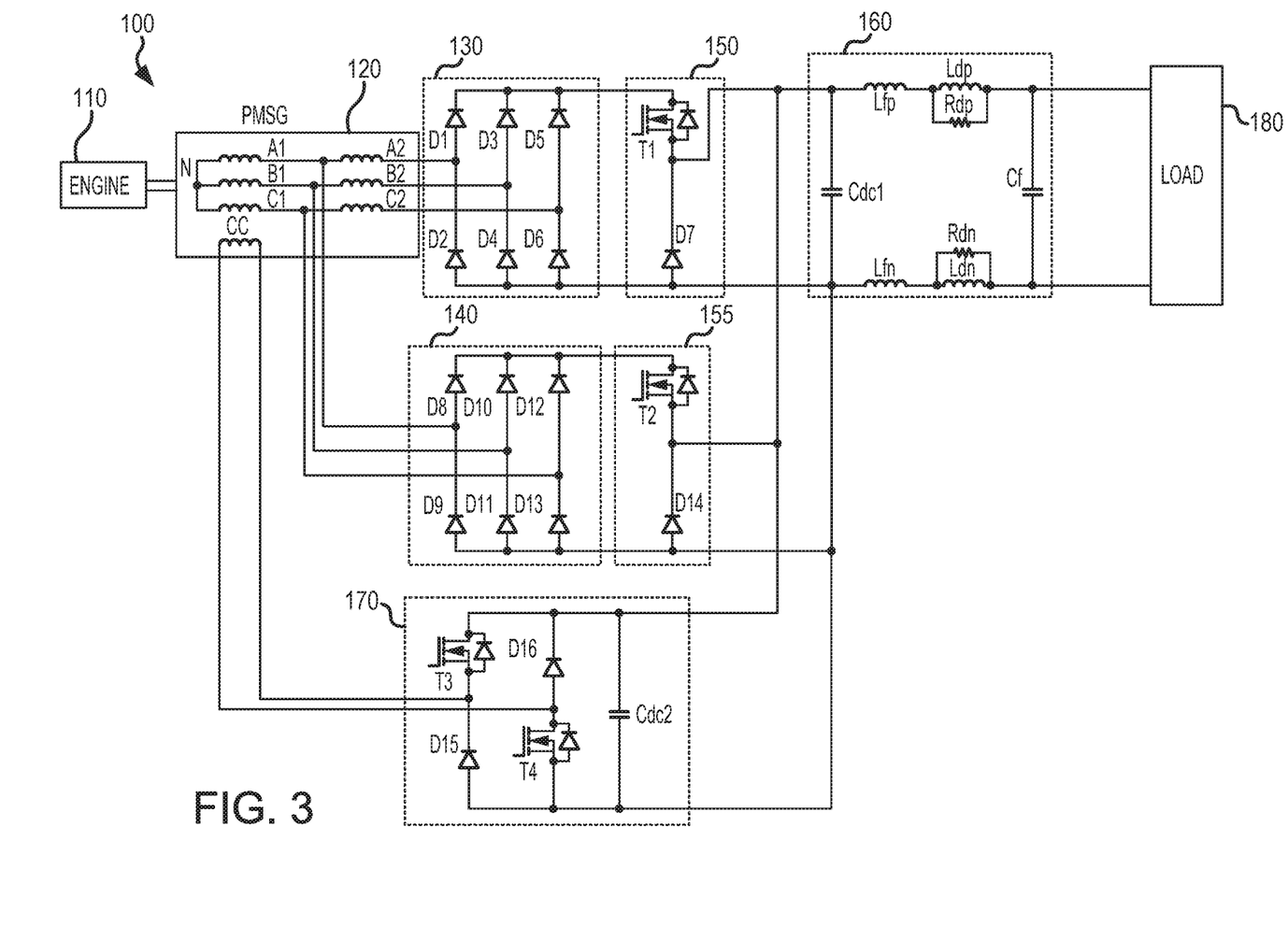
FIG. 3 illustrates a schematic view of the EPS of FIG. 1, in accordance with various embodiments.

With reference to FIG. 3, a schematic view of EPS 100 is illustrated, in accordance with various embodiments. In various embodiments, rectifier 130 may comprise a passive rectifier. Rectifier 130 may comprise a six-pulse rectifier, comprising six diodes (D1, D2, D3, D4, D5, and D6). In various embodiments, rectifier 130 may be configured to output a voltage of, for example, between one hundred and twenty volts and six hundred volts (120V-600V), and in various embodiments, between two hundred and forty volts and three hundred volts (240V-300V), and in various embodiments, two hundred and seventy volts (270V). Rectifier 140 may comprise a topology similar to rectifier 140.

In various embodiments, circuit breaker 150 may comprise a transistor (T1). Transistor (T1) may comprise an insulated-gate bipolar transistors (IGBTs) and/or metal-oxide semiconductor field-effect transistors (MOSFETs). Transistor (T1) may comprise a transistor/diode pair. Circuit breaker 150 may comprise a diode (D7). Transistor (T1) may be electronically controlled to open and/or close the circuit, thereby controlling the electric power received by load 180. However, circuit breaker 150 may comprise any suitable switch for opening and closing the circuit. Circuit breaker 155 may comprise a topology similar to circuit breaker 150.

Filter 160 may comprise inductor Lfp, inductor Ldp, inductor, Lfn, inductor Ldn, resistor Rdp, resistor Rdn, and filter capacitor Cf Inductor Lfp may be connected in series with resistor Rdp and inductor Ldp. Resistor Rdp and inductor Ldp may be connected in parallel. Inductor Lfn may be connected in series with resistor Rdn and inductor Ldn. Resistor Rdn and inductor Ldn may be connected in parallel. Filter capacitor Cf may be connected in parallel with the load 180. Filter 160 may comprise a capacitor (Cdc1). Filter 160 may improve the quality of the DC output voltage. In various embodiments, load 180 may receive the filtered DC output voltage. Load 180 may be connected across filter 160.

Figure 4:
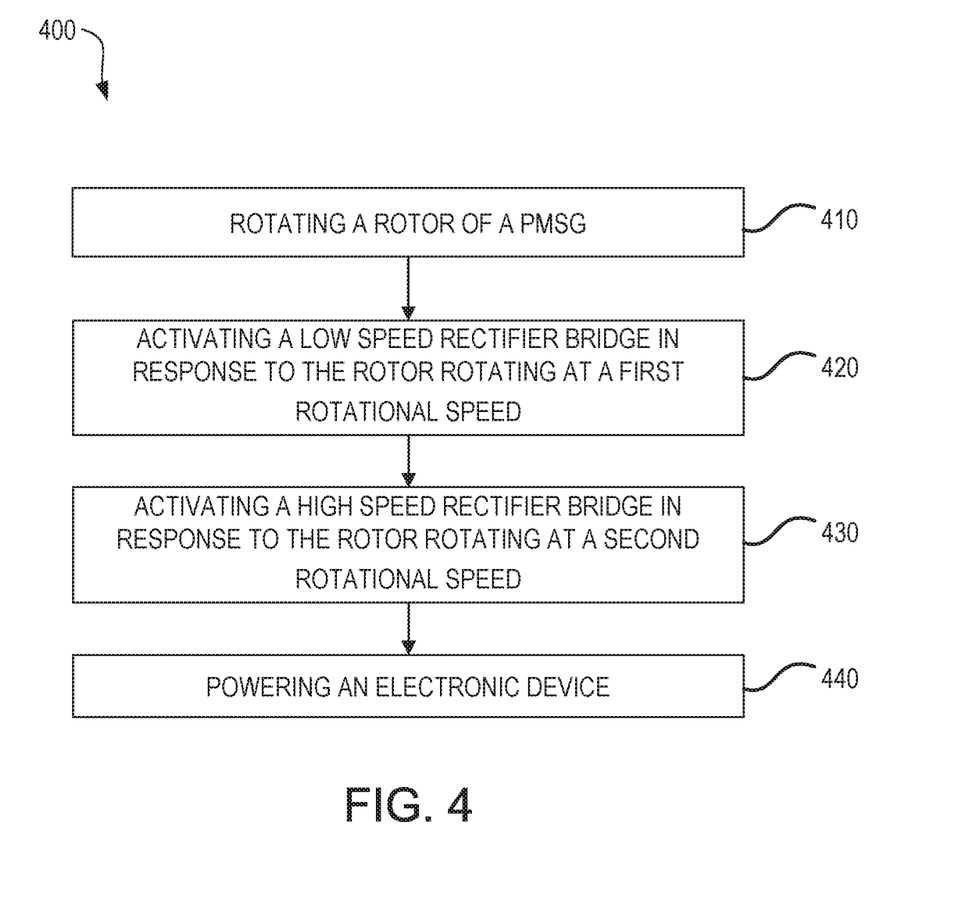
FIG. 4 illustrates a method for operating an electric power system (EPS), in accordance with various embodiments.

With reference to FIG. 4, a method 400 for operating an EPS is provided, in accordance with various embodiments. Method 400 includes rotating a rotor of a PMSG (step 410). Method 400 includes activating a low speed rectifier bridge in response to the rotor rotating at a first rotational speed (step 420). Method 400 includes activating a high speed rectifier bridge in response to the rotor rotating at a second rotational speed (step 430). Method 400 includes powering an electronic device (step 440).

With combined reference to FIG. 1 and FIG. 4, step 410 may include rotating the rotor of PMSG 120. Step 420 may include closing circuit breaker 150 to activate rectifier 130 in response to the rotor of PMSG 120 rotating at the first rotational speed. Step 430 may include closing circuit breaker 155 to activate rectifier 140 in response to the rotor of PMSG 120 rotating at the second rotational speed. Step 440 may include powering load 180.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric power system (EPS), comprising:
   a control coil converter;
   a high speed, passive rectifier bridge;
   a low speed, passive rectifier bridge; and
   a permanent magnet synchronous generator (PMSG), comprising:
      a stator assembly comprising:
         a first stator winding;
         a second stator winding;
         a third stator winding; and
         a control coil;
   wherein the control coil converter is configured to detect an output voltage of the PMSG and regulate the output voltage of the PMSG by regulating magnetic flux in the stator assembly via the control coil;
   the high speed, passive rectifier bridge is configured to receive a first alternating current (AC) power from the PMSG;
   the low speed, passive rectifier bridge configured to receive a second AC power from the PMSG;
   the low speed rectifier bridge is configured to receive the first AC power in response to the PMSG rotating at a first rotational speed, and
   the high speed rectifier bridge is configured to receive the second AC power in response to the PMSG rotating at a second rotational speed.

2. The EPS of claim 1, wherein the first AC power corresponds to a first number of turns of the first stator winding and the second AC power corresponds to a second number of turns of the first stator winding.

3. The EPS of claim 2, wherein the first number of turns is less than the second number of turns.

4. The EPS of claim 1, wherein the high speed rectifier bridge is configured to rectify the first AC power into a first direct current (DC) power, and the low speed rectifier bridge is configured to rectify the second AC power into a second DC power.

5. The EPS of claim 1, further comprising:
   a first circuit breaker configured to at least one of activate and disable the low speed rectifier bridge; and
   a second circuit breaker configured to at least one of activate and disable the high speed rectifier bridge.

6. The EPS of claim 5, wherein
   the first circuit breaker activates the low speed rectifier bridge in response to the PMSG rotating at the first rotational speed,
   the second circuit breaker activates the high speed rectifier bridge in response to the PMSG rotating at the second rotational speed,
   the first circuit breaker disables the low speed rectifier bridge in response to the PMSG rotating at the second rotational speed, and
   the second circuit breaker disables the high speed rectifier bridge in response to PMSG rotating at the first rotational speed.

7. The EPS of claim 1, further comprising a filter configured to filter at least one of the first DC power and the second DC power.

8. The EPS of claim 2, wherein the high speed rectifier bridge is connected to each of the first stator winding, the second stator winding, and the third stator winding of the PMSG at a location between the first number of turns and the second number of turns.

9. The EPS of claim 1, wherein the control coil is in electronic communication with the control coil converter, and the control coil is operatively coupled to at least one of the first stator winding, the second stator winding, and the third stator winding.

10. The EPS of claim 9, wherein the control coil converter comprises an asymmetric H-bridge topology.

11. The EPS of claim 9, wherein the control coil converter controls a direct current (DC) output voltage of the PMSG.

12. The EPS of claim 1, wherein the control coil is electronically coupled, independent of a rotor of the PMSG, to at least one of the first stator winding, the second stator winding, and the third stator winding.

13. A method for operating an electric power system (EPS), comprising:
   activating a low speed, passive rectifier bridge in response to a permanent magnet synchronous generator (PMSG) rotating at a first speed;
   activating a high speed, passive rectifier bridge in response to the PMSG rotating at a second speed;
   detecting, by a control coil converter, an output voltage of the PMSG; and
   regulating, by the control coil converter, the output voltage of the PMSG, by regulating magnetic flux in a stator assembly of the PMSG via a control coil, wherein the stator assembly comprises the control coil and a stator winding;
   wherein the low speed, passive rectifier bridge receives a first AC power corresponding to a second number of turns of the stator winding of the PMSG; and
   wherein the high speed, passive rectifier bridge receives a second AC power corresponding to a first number of turns of the stator winding of the PMSG.

14. The method of claim 13, further comprising rotating the PMSG.

15. The method of claim 14, further comprising:
   generating the first AC power in response to the PMSG rotating at the first speed;

generating the second AC power in response to the PMSG rotating at the second speed;

generating a first DC power utilizing the first AC power, wherein the first DC power is generated by the low speed, passive rectifier bridge; and generating a second DC power utilizing the second AC power.

16. The method of claim 13, further comprising powering an electronic device with at least one of the first DC power or the second DC power in response to the PMSG rotating at either of the first speed and the second speed.

* * * * *